G. HAVELL.
Casters for Trunks.
No. 133,856. Patented Dec. 10, 1872.
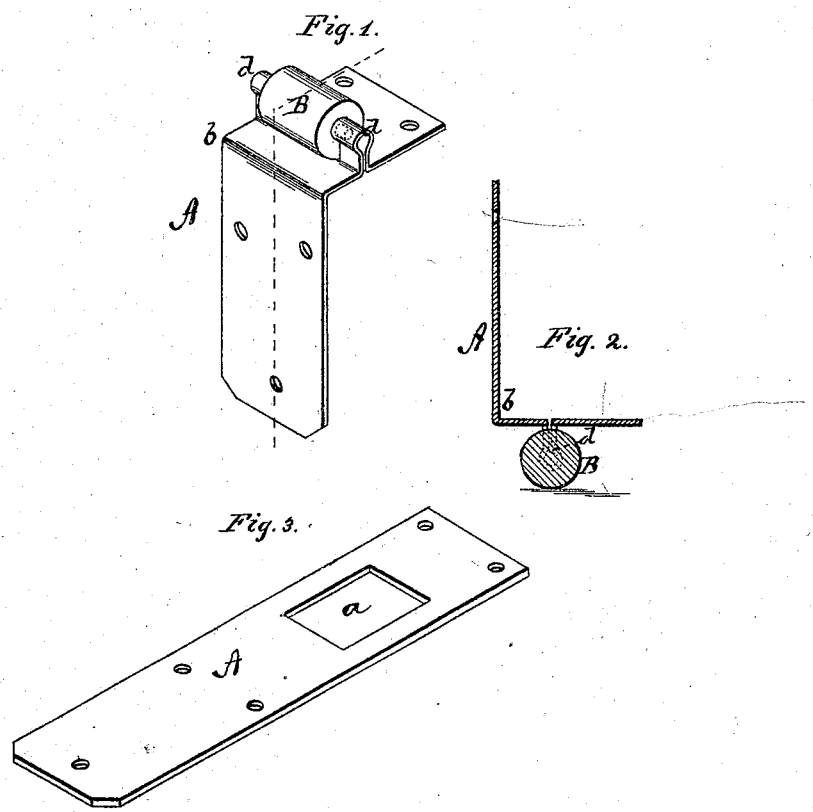
Witness:
Henry N. Miller
C. L. Evert
Inventor.
George Havell.
per
Alexander Mason
Attorneys.

UNITED STATES PATENT OFFICE.

GEORGE HAVELL, OF NEWARK, NEW JERSEY.

IMPROVEMENT IN CASTERS FOR TRUNKS.

Specification forming part of Letters Patent No. 133,856, dated December 10, 1872.

*To all whom it may concern:*

Be it known that I, GEORGE HAVELL, of Newark, in the county of Essex and in the State of New Jersey, have invented certain new and useful Improvements in Trunk-Rollers; and do hereby declare that the following is a full, clear, and exact description thereof, reference being had to the accompanying drawing and to the letters of reference marked thereon making a part of this specification.

In trunk-rollers heretofore made the bearings or journals for the rollers are thrown up from the inside or outside of the sheet in a direction contrary to that in which the roller runs, thus having the axle of the roller running on the edge of the metal. This is objectionable for many reasons; one of which is, that the axle, running on the edge of the metal, soon wears and breaks off, and the roller gets lost. To obviate this and other objections is the purpose of my invention; and it consists in a sheet-metal plate, with the bearings made from the same, and bent to form said bearings in a direction the same as the roller runs; or, in other words, the plate folded to make a bearing, and the face of the sheet used as such bearing.

In order to enable others skilled in the art to which my invention appertains to make and use the same, I will now proceed to describe its construction and operation, referring to the annexed drawing, in which—

Figure 1 is a perspective view of my trunk-roller and bearing; Fig. 2 is a longitudinal section of the same; and Fig. 3 is a perspective view of the plate before it is bent to form the roller-bearings.

A represents a plate of sheet metal, in which is made an aperture, $a$, of such width that the roller B can pass through the same lengthwise without jamming. This plate is bent at $b$ to form a stay or brace for the trunk-bottom, the aperture $a$ being in that part which is under the bottom. This part is bent, as shown, so that the two ends of the aperture will come close together, and the parts of the metal at the sides of said aperture will form the bearings $d\ d$, which thus run in the direction of the roller.

The axle of the roller being placed in said bearings and the roller between them, the axle runs on the face of the plate and not on the edge thereof, as has been heretofore the case.

Having thus fully described my invention, what I claim as new, and desire to secure by Letters Patent, is—

The angular sheet-metal plate A, with slot $a$ and roller-bearings $d\ d$ bent up from the plate, in combination with the roller B having journals fitting into said bearings, all substantially as set forth.

In testimony that I claim the foregoing I have hereunto set my hand this 24th day of October, 1872.

GEORGE HAVELL.

Witnesses:
C. L. EVERT,
JOHN H. KERR.